United States Patent
Suzuki

(10) Patent No.: US 7,978,597 B2
(45) Date of Patent: Jul. 12, 2011

(54) COMMUNICATION MANAGEMENT SYSTEM, COMMUNICATION MANAGEMENT METHOD, AND COMMUNICATION MANAGEMENT DEVICE

(75) Inventor: Tomoyasu Suzuki, Chiba (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1 day.

(21) Appl. No.: 12/351,963

(22) Filed: Jan. 12, 2009

(65) Prior Publication Data
US 2009/0225651 A1 Sep. 10, 2009

(30) Foreign Application Priority Data
Mar. 7, 2008 (JP) ................. 2008-058405

(51) Int. Cl.
G01R 31/08 (2006.01)
(52) U.S. Cl. ......... 370/218; 370/216; 370/219; 370/220
(58) Field of Classification Search .......... 370/216, 370/217, 218, 219, 220
See application file for complete search history.

(56) References Cited

U.S. PATENT DOCUMENTS
7,583,661 B2 * 9/2009 Chaudhuri ............... 370/353
2009/0161534 A1 * 6/2009 Matsuura ............... 370/220

FOREIGN PATENT DOCUMENTS
JP 2006-033467 A 2/2006
JP 2007-251809 A 9/2007
* cited by examiner

*Primary Examiner* — Chi H Pham
*Assistant Examiner* — Weibin Huang
(74) *Attorney, Agent, or Firm* — Marvin A. Motsenbocker; MOTS Law, PLLC

(57) ABSTRACT

A failure is detected in at least one of an active system including an active packet transfer board, an active system packet processing board, and an active system switch board. At least function setting information for executing functions of the active system packet transfer board and the active packet processing board is stored. When failure is detected in active system, a system switching instruction is outputted to the standby system including a standby packet transfer board, a standby system packet processing board, and a standby system switch board. The stored function setting information of one or both of the active system packet transfer board and the active system packet processing board that have been detected a failure is transmitted to the one or both of the standby system packet transfer board and the standby system packet processing board that correspond to boards that have been detected a failure.

7 Claims, 7 Drawing Sheets

FIG. 7

| PACKET TRANSFER BOARD (NETWORK 1 SIDE) | PACKET TRANSFER BOARD (NETWORK 2 SIDE) | PACKET PROCESSING BOARD | LAYER 2 SW |
|---|---|---|---|
| PACKET TRANSFER BOARD 6-1: ACTIVE SYSTEM | PACKET TRANSFER BOARD 7-1: ACTIVE SYSTEM | PACKET PROCESSING BOARD 8-1: ACTIVE SYSTEM | LAYER 2 SW 9-1: ACTIVE SYSTEM |
| PACKET TRANSFER BOARD 6-2: STANDBY SYSTEM | PACKET TRANSFER BOARD 7-2: STANDBY SYSTEM | PACKET PROCESSING BOARD 8-2: STANDBY SYSTEM | LAYER 2 SW 9-2: STANDBY SYSTEM |

COMMUNICATION MANAGEMENT SYSTEM, COMMUNICATION MANAGEMENT METHOD, AND COMMUNICATION MANAGEMENT DEVICE

CROSS REFERENCE TO RELATED APPLICATIONS

This application claims priority based on 35 USC 119 from prior Japanese Patent Application No. P2008-058405 filed on Mar. 7, 2008, the entire contents of which are incorporated herein by reference.

BACKGROUND OF THE INVENTION

1. Field of the Invention

The present invention relates to a communication management system, a communication management method, and a communication device. The present invention is applicable for maintaining communication service in the communication system, for example, when a failure occurs in a system that processes a packet on a network.

2. Description of Related Art

In a system switching technique of the related art, a packet data conversion processor used in a media gateway device has a redundant configuration capable of shortening down-time for communication when a fault occurs.

In the media gateway device, packet data is converted between existing telephonic communications and VoIP (Voice Over IP). That is, a communication medium is changed between the time division multiplex communication and the packet communication. In such a media gateway device, the packet data conversion processor has a redundant configuration formed of two systems: an active system and a standby system. When the standby system is switched to the active system, the processing can be performed using the communication information used so far by setting the same communication information as in the active system in the standby system. Down-time for communication can thus be shortened in the above technique Specifically in the improved art, a layer 2 switch is connected to an active system packet processor and a standby system packet processor. When a failure is detected by a fault detection circuit connected to the layer 2 switch, the layer 2 switch causes the standby system to take over the operation from the active system, by referring to a preregistered VLAN port reference table.

However, although the media gateway device in the related art includes the redundant configuration of the packet data conversion processor and performs the system switching processing, it has the following possible problem. That is, the media gateway device in the related art cannot cope with a failure that occurs in a processor for receiving the communication from a network, or a controller that manages the same data for the packet data conversion processing in the active system and the standby system.

In addition, the media gateway device in the improved related art has the following possible problem. That is, it cannot cope with a failure when the failure occurs in the layer 2 switch itself, including the fault detection circuit for monitoring and detecting a failure in a connection port destination device.

Accordingly, what is needed are a communication management system, a communication management method, and a communication device capable of maintaining the provision of the communication service even when a failure occurs in a communication processor, a packet processing controller, or a layer 2 switch itself configured to switch data in the communication device.

SUMMARY OF THE INVENTION

An aspect of the invention provides a communication management system that comprises: a first system packet transfer board including a controller and a function unit; a second system packet transfer board including a controller and a function unit; a first system packet processing board including a controller and a function unit; a second system packet processing board including a controller and a function unit; a communication control board Including a controller; a first system switch board connected to the communication control board, the first system packet transfer board, the second system packet transfer board, the first system packet processing board, and the second system packet processing board; and a second system switch board connected to the communication control board, the first system packet transfer board, the second system packet transfer board, the first system packet processing board, and the second system packet processing board; wherein the controller of the communication control board comprises: a failure detector configured to detect at least one of a failure in the first system packet transfer board, the first system packet processing board, and the first system switch board; a function setting information storing unit configured to store function setting information needed to execute functions of the function unit of the first system packet transfer board and the function unit of the first system packet processing board; a system switching controller configured to, upon detection of a failure in one or more of the first system packet transfer board, the first system packet processing board, and the first system switch board, output a system switching instruction to said one or more of the second system packet transfer board, the second system packet processing board, and the second system switch board, corresponding to the board in which the failure has occurred; and a function setting unit configured to provide the corresponding function setting information stored in the function setting information storing unit to one or both of the second system packet transfer board and the second system packet processing board that corresponds to the board in which the failure has occurred.

Another aspect of the invention provides a communication management method using a communication device with a redundant configuration including an active system and a standby system, the method comprises: detecting a failure in at least one of an active system including an active packet transfer board, an active system packet processing board, and an active system switch board; storing at least function setting information for executing functions of the active system packet transfer board and the active packet processing board; when failure is detected in one or more of the active packet transfer board, the active system packet processing board, and the active system switch board, outputting a system switching instruction to the standby system including a standby packet transfer board, a standby system packet processing board, and a standby system switch board; and transmitting the stored function setting information of one or both of the active system packet transfer board and the active system packet processing board that have been detected a failure to the one or both of the standby system packet transfer board and the standby system packet processing board that correspond to boards that have been detected a failure.

Another aspect of the invention provides a communication device that comprises the communication management system described above.

BRIEF DESCRIPTION OF THE DRAWINGS

FIG. 7 is a diagram showing an example of management of active system boards by a control board according to the first embodiment.

DETAILED DESCRIPTION OF EMBODIMENTS (A) First Embodiment

Hereinafter, a first embodiment of a communication management system, a communication management method, and a communication device according to the present invention is described in detail with reference to the drawings.

(A-1) Configuration of the First Embodiment

Figure 1:
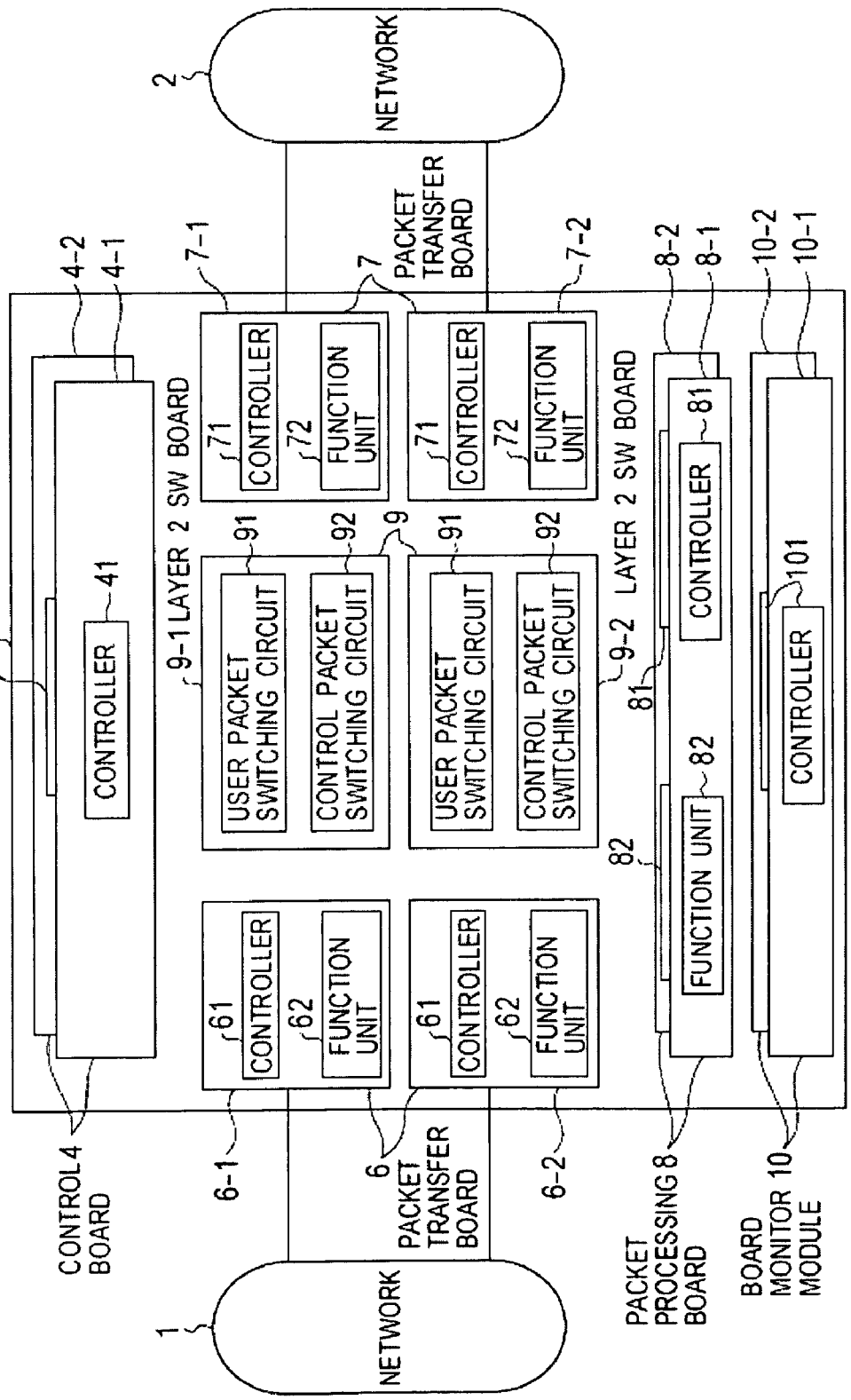
FIG. 1 is a diagram showing a configuration of an information retrieval system in which an internal configuration of a communication device according to a first embodiment is shown.

FIG. 1 is an internal configuration diagram showing an internal configuration of communication device 3 according to the first embodiment. As shown in FIG. 1, communication device 3 of the first embodiment is connected to network 1 and network 2 and includes at least two control boards 4 (4-1 for an active system and 4-2 for a standby system), two packet transfer boards 6 (6-1 for an active system and 6-2 for a standby system), two packet transfer boards 7 (7-1 for an active system and 7-2 for a standby system), two packet processing boards 8 (8-1 for an active system and 8-2 for a standby system), two layer 2 switch boards 9 (9-1 for an active system and 9-2 for a standby system), and two board monitor modules 10 (10-1 for an active system and 10-2 for a standby system).

A packet transfer board on active during the operation of the system is called active system packet transfer board, and a packet board for standby during the same is called standby system packet transfer board.

Each of networks 1 and 2 is connected to an unillustrated user terminal. Networks 1 and 2 are networks through which a user packet given to and received from the user terminal is transferred.

Each of control boards 4-1 and 4-2 controls communication processing performed in communication device 3, and is formed of two control boards: one for the active system and one for the standby system. Each of control boards 4-1 and 4-2 has controller 41.

Figure 2:
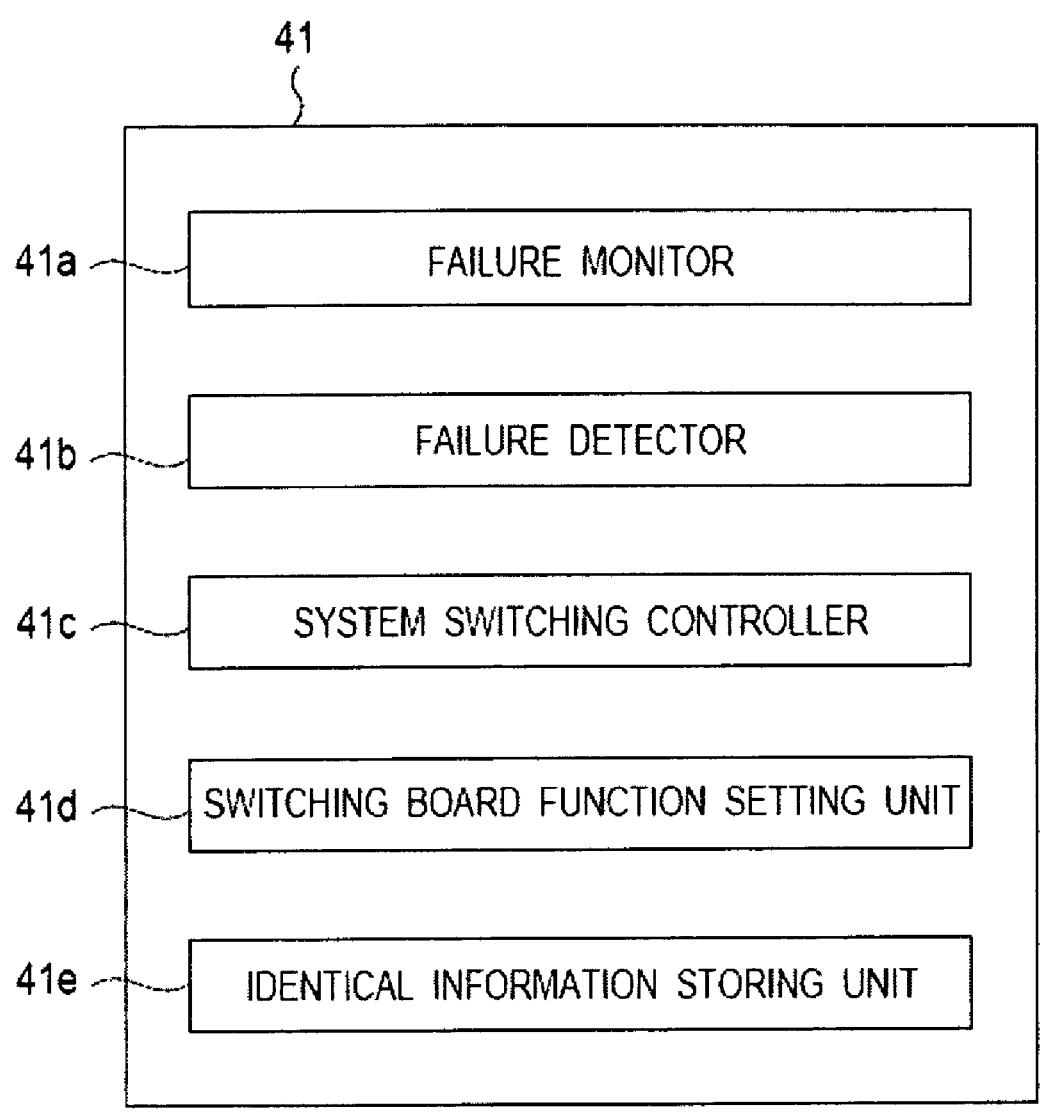
FIG. 2 is a functional block diagram showing main functions of a controller of a control board according to the first embodiment.

FIG. 2 is a functional block diagram showing main functions of a controller 41 of control boards 4-1 and 4-2. As shown in FIG. 2, controller 41 of control boards 4-1 and 4-2 has at least failure monitor 41*a*, failure detector 41*b*, system switching controller 41*c*, switching board function setting unit 41*d*, and identical information storing unit 41*e*.

Failure monitor 41*a* monitors whether a failure occurs in boards 4, 6, 7, 8, and 9 in communication device 3. Various methods including the following method are widely applicable as a monitor method using failure monitor 41*a*. Specifically, in one of the methods, a control packet is transmitted to each of boards 4, 6, 7, 8, and 9 of the active system to check their statuses—dead or alive—based on whether each of boards 4, 6, 7, 8, and 9 replies to the control packet.

When the statuses of boards 6, 7, and 8 of the active system other than layer 2 switch board 9 are to be checked, their replies may not arrive if a failure occurs in layer 2 switch board 9.

In the case where failure monitor 41*a* transmits the control packet to boards 6, 7, and 8 of the active system other than layer 2 switch board 9 and confirms no reply from the boards 6, 7, and 8, failure monitor 41*a* transmits the control packet to layer 2 switch board 9 of the active system. Then, if a reply is sent from layer 2 switch board 9, it can be determined that layer 2 switch board 9 is in normal operation. If no reply is sent from layer 2 switch board 9, it can be determined that layer 2 switch board 9 itself is operating abnormally.

Failure detector 41*b* detects failure either based on the monitor result by failure monitor 41*a* or by receiving a signal that indicates failure detection from boards 4, 6, 7, 8, and 9 of the standby system. The signal indicating failure detection is transmitted from boards 4, 6, 7, 8, and 9 by a control packet.

System switching controller 41*c* manages the active system or the standby system of respective boards 4, 6, 7, 8, and 9. Upon detection of failure in any of boards 4, 6, 7, 8, and 9, system switching controller 41*c* switches the system of the board—out of boards 4, 6, 7, 8, and 9—in which the failure has occurred. Controller 41 performs this system switching operation using a control packet.

Identical information storing unit 41*e* holds setting information needed to execute the function of function units 62 and 72 of packet transfer boards 6 and 7 of the active system, as well as setting information needed to execute the function of function unit 82 of packet processing board 8 of the active system.

When the functions in packet transfer boards 6 and 7 and packet processing board 8 are to be executed, the setting information needed for these function units 62 and 72 and function unit 82 is given to controller 41 of control board 4 of the active system by a control packet.

Identical information storing unit 41*e* of controller 41 in control board 4 of the active system gives the setting information on various functions received from packet transfer boards 6 and 7 and packet processing board 8 to identical information storing unit 41*e* of controller 41 in control board 4 of the standby system. Thereby, control boards 4 of the active system and of the standby system can hold identical setting information sequentially.

Switching board function setting unit 41*d* gives the setting information of boards 6, 7, and 8 stored in identical information storing unit 41*e* to boards 6, 7, and 8 of the standby system by a control packet, at the same time as system switching controller 41*c* outputs a system switching instruction to any of boards 6, 7, and 8 in which the failure has occurred.

Thereby, the setting information used so far on the various functions can be quickly and exactly passed to the standby system of the board in which the failure has occurred. Accordingly, communication services can be maintained.

Layer 2 switch boards 9-1 and 9-2 are two layer 2 switch boards of the active system and of the standby system. Each of layer 2 switch boards 9-1 and 9-2 has at least user packet switching circuit 91 configured to perform a process for switching a user packet, and control packet switching circuit 92 configured to perform a process for switching a control packet.

Each of user packet switching circuits 91 in layer 2 switch boards 9-1 and 9-2 gives a user packet received through packet transfer board 6 or 7 to the boards in communication device 3. Then, to transfer the user packet subjected to a predetermined processing in the boards, each user packet switching circuit 91 in layer 2 switch boards 9-1 and 9-2 gives the user packet to the other packet transfer board 7 or 6.

Figure 3:
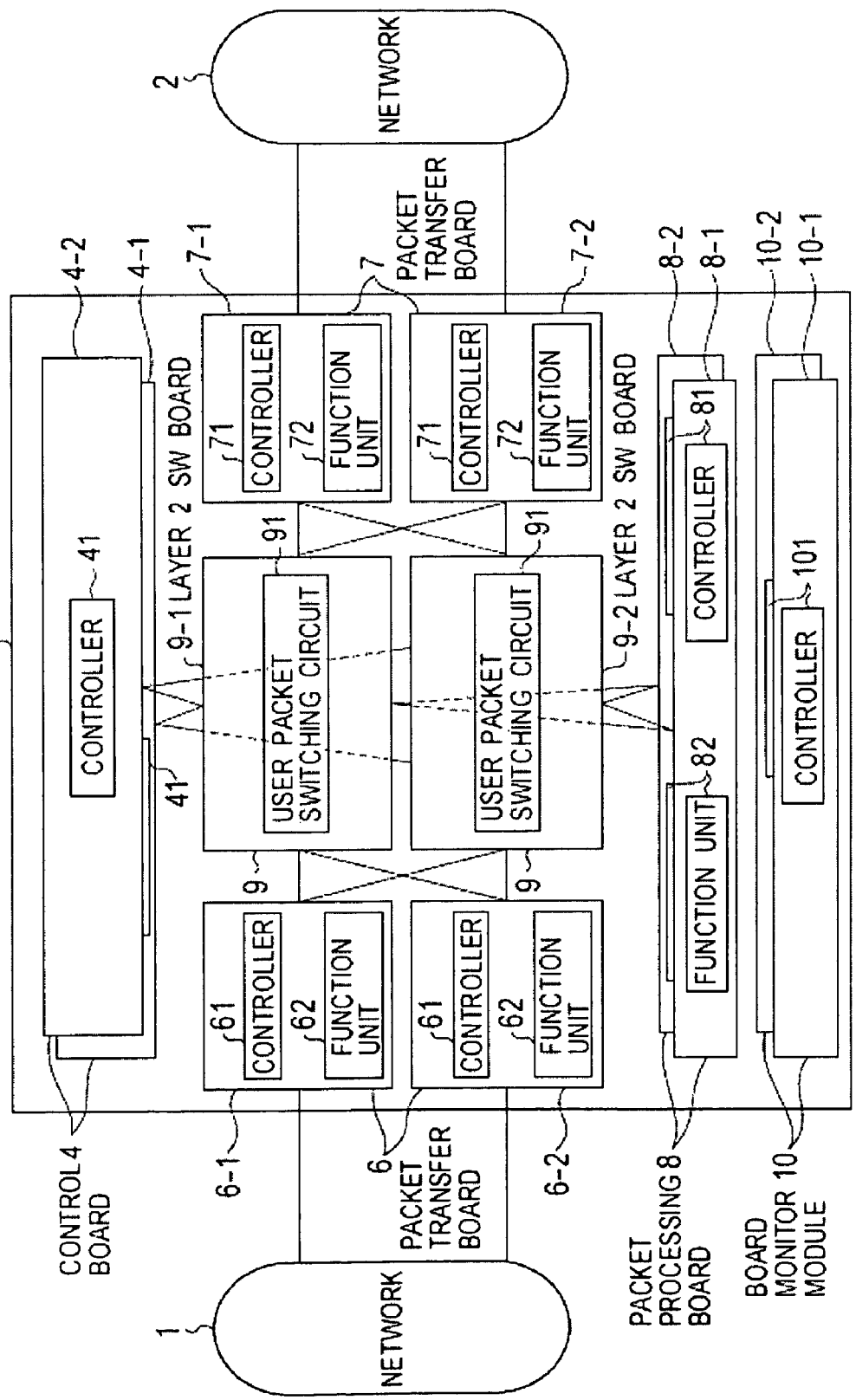
FIG. 3 is a diagram showing a connection relation with respect to transmission and reception of user data according to the first embodiment.

Here, FIG. 3 shows a connection relation between layer 2 switch boards 9-1 and 9-2 and the other boards, in which layer 2 switch boards 9-1 and 9-2 pass the user packet within communication device 3. As shown in FIG. 3, layer 2 switch boards 9-1 and 9-2 are respectively connected with control boards 4-1 and 4-2, packet transfer boards 6-1 and 6-2, packet transfer boards 7-1 and 7-2, and packet processing boards 8-1 and 8-2.

In this way, even when failure occurs in either of two layer 2 switch boards 9-1 and 9-2, the user packet within communication device 3 can be passed. Accordingly, termination of the communication service can be avoided when the failure occurs.

Moreover, each of control packet switching circuits 92 in layer 2 switch boards 9-1 and 9-2 passes a control packet among the boards within communication device 3.

Figure 4:
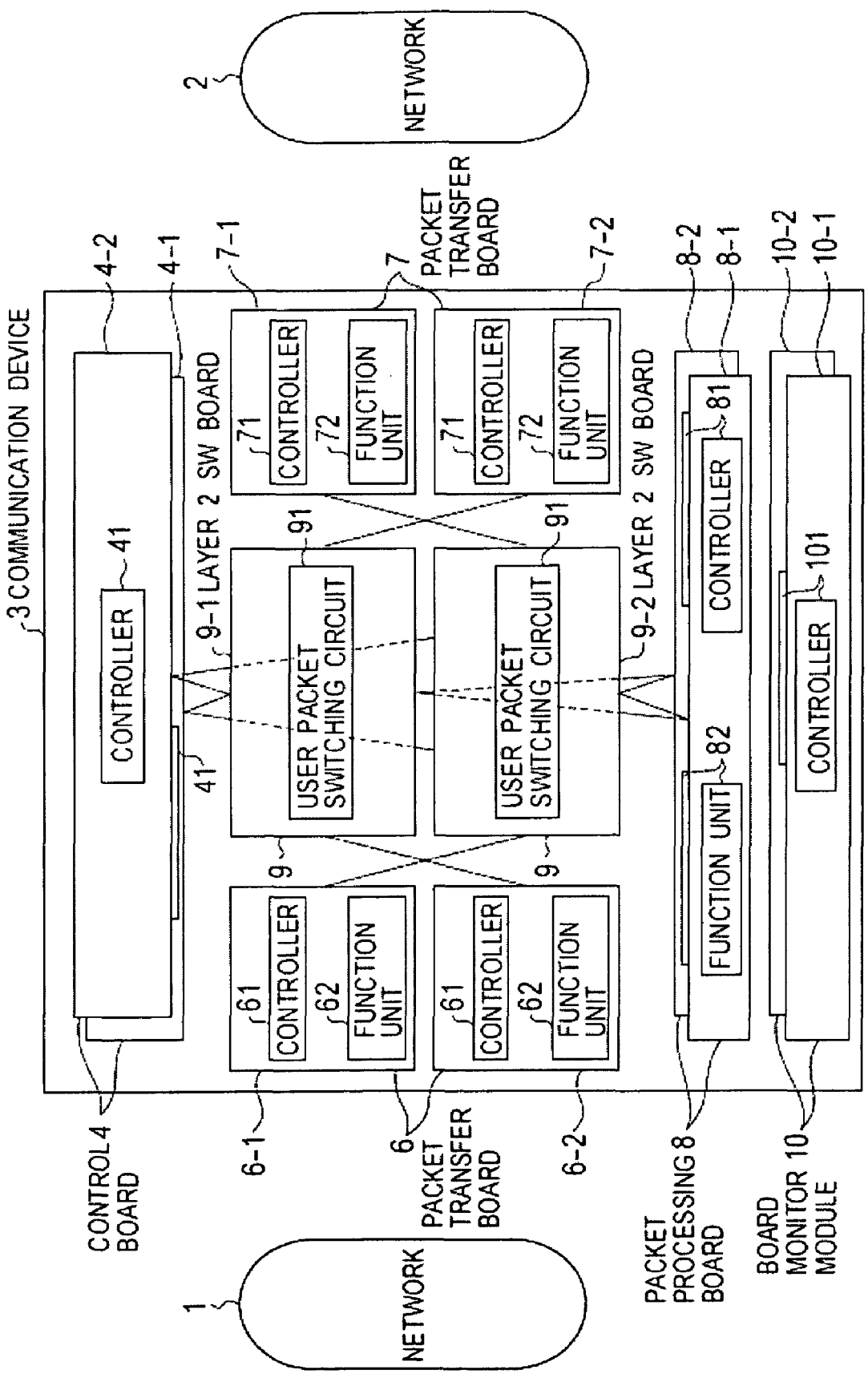
FIG. 4 is a diagram showing a connection relation with respect to transmission and reception of a control packet according to the first embodiment.

Here, FIG. 4 shows a connection relation between layer 2 switch boards 9-1 and 9-2 and the other boards in which layer 2 switch boards 9-1 and 9-2 pass the control packet within communication device 3. As shown in FIG. 4, layer 2 switch boards 9-1 and 9-2 are respectively connected with control boards 4-1 and 4-2, packet transfer boards 6-1 and 6-2, packet transfer boards 7-1 and 7-2, and packet processing boards 8-1 and 8-2. Both of the active system and the standby system in respective boards 4, 6, 7, and 8 are previously connected. Therefore, the standby system does not require a connection when the failure occurs. Accordingly, when the failure occurs, the system switches quickly.

Thereby, control board 4 can monitor whether boards 6, 7, 8, and 9 of the active system within communication device 3 are normally operating. Additionally, when the failure occurs in respective boards 6, 7, 8, and 9, the system switching operation or the various function setting operation and other operations can be performed in response to an instruction of control board 4.

Although the connection shown in FIG. 4 in which the control packet is passed is the same as the connection shown in FIG. 3 in which the user packet is passed, the connection shown in FIG. 4 is established through a network physically different from that of the connection shown in FIG. 3.

Moreover, the active system and the standby system in respective boards 4, 6, 7, and 8 are previously connected to layer 2 switch board 9. Therefore, the standby system does not require a connection when the failure occurs. Accordingly, when the failure occurs, the user packet and the control packet can be quickly given and received.

Packet transfer boards 6-1 and 6-2 give and receive the user packet to and from network 1, and are two communication boards: one of the active system and one of the standby system. Both packet transfer boards 6-1 and 6-2 are physically connected with network 1.

Each of packet transfer boards 6-1 and 6-2 at least includes: ports respectively connected to both of layer 2 switch boards 9-1 and 9-2; function unit 62 configured to implement various functions concerning packet transfer; and controller 61.

The controller 61 of packet transfer boards 6-1 and 6-2 gives and receives the control packet to and from controller 41 of control boards 4-1 and 4-2 through layer 2 switch boards 9-1 and 9-2.

Figure 5:
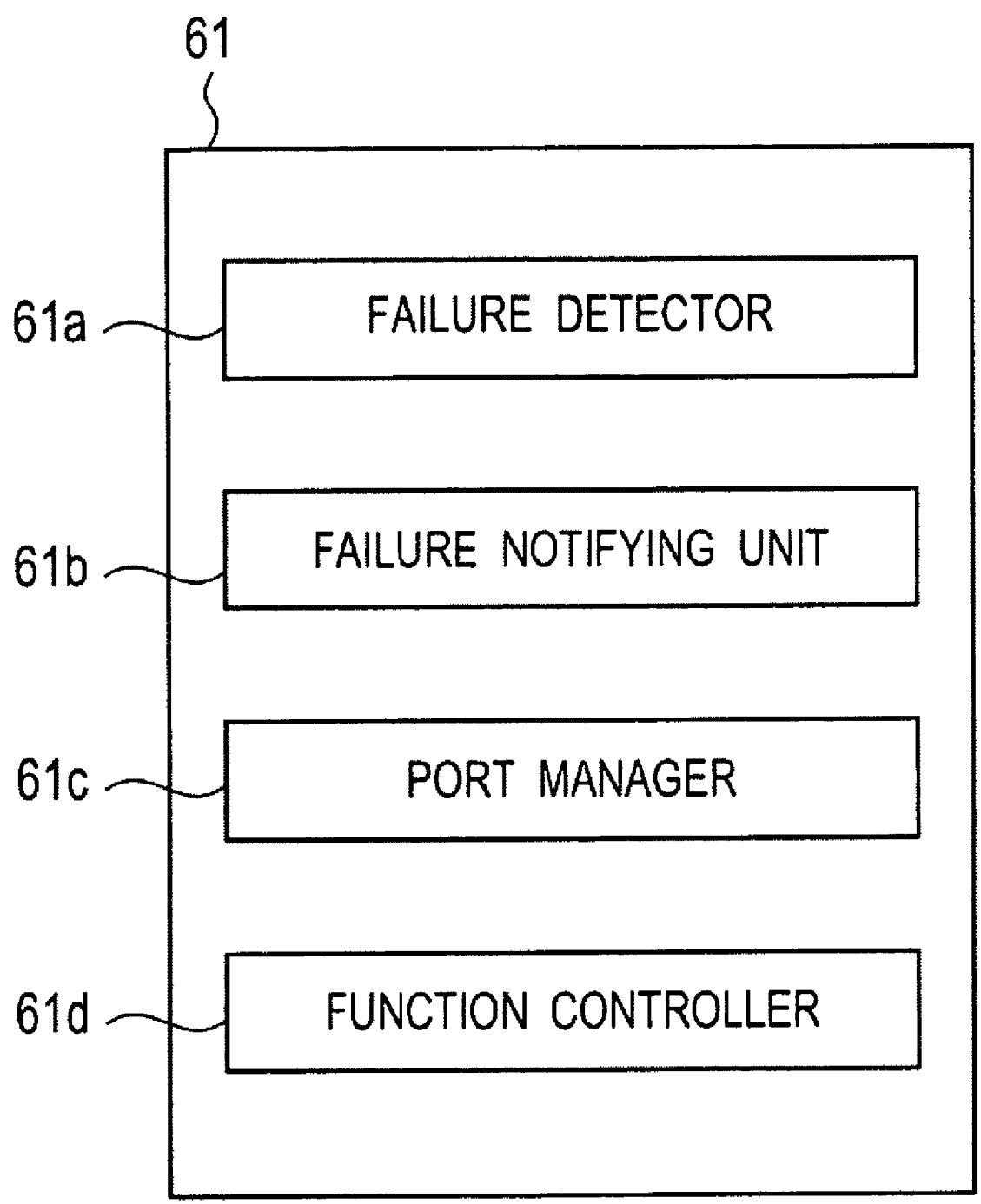
FIG. 5 is a functional block diagram showing main functions of a controller of a packet transfer board according to the first embodiment.

FIG. 5 is a functional block diagram showing main functions of controller 61 of each of packet transfer boards 6-1 and 6-2. As shown in FIG. 5, controller 61 at least includes: failure detector 61a configured to detect a failure in the ports of packet transfer boards 6-1 and 6-2; failure notifying unit 61b configured to notify controller 41 in control boards 4-1 and 4-2 of occurrence of the failure when the failure occurs; port manager 61c configured to manage closing of the port and opening of the port; and function control unit 61d configured to set operation setting information on function unit 62 received from controller 41 at the time of system switching.

Packet transfer boards 7-1 and 7-2 give and receive the user packet to and from network 2, and are two communication boards: one for the active system and one for the standby system. Both of packet transfer boards 7-1 and 7-2 are physically connected with network 2.

Each of packet transfer boards 7-1 and 7-2 at least includes: ports respectively connected to both of layer 2 switch boards 9-1 and 9-2; function unit 72 configured to implement various functions concerning packet transfer; and controller 71.

Since the main functions and the configurations of packet transfer boards 7-1 and 7-2 are the same as those of packet transfer boards 6-1 and 6-2, detailed descriptions are omitted for sake of brevity.

Packet processing boards 8-1 and 8-2 perform various packet processings to the user packet to be transferred, and are two boards: one for the active system and one for the standby system. Each of packet processing boards 8-1 and 8-2 at least include: ports for transferring the user packet to layer 2 switch boards 9-1 and 9-2; function unit 82 configured to perform various processings on the user packet; and controller 81.

Here, as a function performed by function unit 82 of packet processing boards 8-1 and 8-2, various functions are applicable. For example, the following function can be applied. Specifically, in a case where the codec method used in network 1 is different from the codec method used in network 2, when an IP packet (voice packet or video packet) received from network 1 is transferred, the function performs interconversion processing of codecs.

Figure 6:
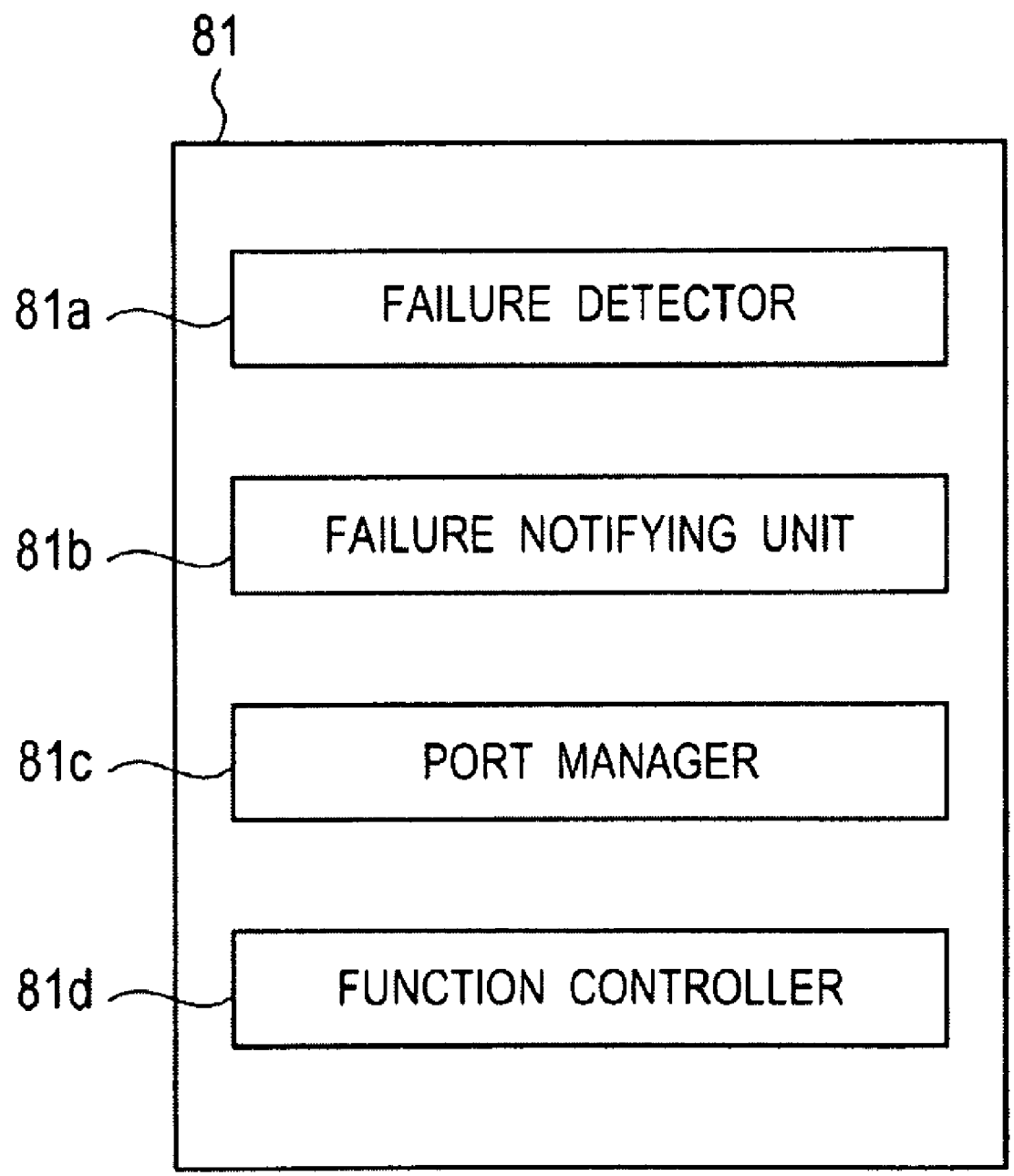
FIG. 6 is a functional block diagram showing main functions of a controller of a packet processing board according to the first embodiment.

FIG. 6 is a functional block diagram showing main functions of controller 81 in packet processing boards 8-1 and 8-2. As shown in FIG. 6, controller 81 at least includes: failure detector 81a configured to detect a failure of the packet processing board by transmitting and receiving the control packet to and from control boards 4-1 and 4-2; failure notifying unit 81b configured to notify control boards 4-1 and 4-2 of detection of the failure when the failure is detected; port manager 81c configured to close or open the ports; and function controller 81d configured to control operation of function unit 82.

Board monitor modules 10-1 and 10-2 monitor the boards within communication device 3, and are two boards: one for the active system and one for the standby system. Board monitor modules 10-1 and 10-2 each include controller 101, and monitor if any of boards 4, 6, 7, 8, and 9 within communication device 3 is incorporated or detached by manual operation. Upon detection of such event, controller 101 informs such fact by a predetermined method.

A method applicable as the notification method is a method of notifying a system administrator using a unique method in board monitor modules 10-1 and 10-2. Alternatively, board monitor modules 10-1 and 10-2 may of course be connected with layer 2 switch boards 9-1 and 9-2, allowing the control packet to be transmitted to and received from control boards 4-1 and 4-2.

(A-2) Operation of the First Embodiment

Next, a description is given of an operation when a failure occurs in communication device 3 according to the first embodiment.

In the following description, control board 4-1, packet transfer board 6-1, packet transfer board 7-1, packet processing board 8-1, layer 2 switch board 9-1, and board monitor module 10-1 operate as the active system.

Failure monitor 41a of controller 41 of control board 4-1 monitors whether packet transfer board 6-1, packet transfer board 7-1, packet processing board 8-1, layer 2 switch board 9-1, and board monitor module 10-1 normally operate by periodically or constantly transmitting and receiving the control packet to and from packet transfer board 6-1, packet transfer board 7-1, packet processing board 8-1, and board monitor module 10-1 via layer 2 switch board 9-1.

At this time, controller 41 manages whether the above-mentioned components are the active system or the standby system by using predetermined identification information. FIG. 7 is a diagram that exemplifies a method wherein controller 41 manages the active system or standby system of each of boards 6, 7, 8, and 9.

Moreover, although connected to two layer 2 switch boards 9-1 and 9-2 through separate Ethernet (trademark) ports, control board 4-1 presents a virtual logical address to an external host. Thereby, the external host can always access control board 4 of the active system by performing packet transfer using the virtual logical address.

Transfer processing of the user packet in communication device 3 is performed as follows, for example. First, the user packet is inputted to packet transfer board 6-1 from network 1. Upon receiving an instruction from controller 41, function unit 62 processes the user packet in accordance with the instruction. Subsequently, in accordance with an instruction from controller 41, the user packet is either transmitted to packet transfer board 7-1 without further processing, or transmitted to packet processing board 8-1 via layer 2 switch board 9-1.

Thereby, packet processing board 8-1 can perform predetermined packet processing on the user packet received via layer 2 switch 9-1 board under control of controller 81 according to the instruction from controller 41. To perform packet transfer, the user packet subjected to the packet processing is given to packet transfer board 7-1 via layer 2 switch 9-1 board.

Then, packet transfer board 7-1 also performs predetermined processing on the user packet, under control of controller 72 according to an instruction from controller 41 of control board 4-1. The user packet thus processed is then transmitted to network 2.

In this way, the user packet is transferred towards a transfer destination under control of controller 41 in control board 4-1.

While transfer of the user packet is normally performed as mentioned above, identical information storing unit 41e of controller 41 in control board 4-1 stores setting information needed to execute the functions of function unit 61 in packet transfer board 6-1 of the active system, and setting information needed to execute the functions of function unit 81 in packet processing board 8-1 of the active system.

Identical information storing unit 41e also gives the thus-stored identical setting information to identical information storing unit 41e of controller 41 in control board 4-2 of the standby system. Thereby, the identity of the information is maintained.

Here, suppose that a failure occurs in control board 4-1 of the active system. Then, the failure in control board 4-1 of the active system is detected by failure detector 41b of controller 41 in control board 4-2 of the standby system. Upon the detection, system switching controller 41c of the control board 4-2 of the standby system switches control board 4-2 from itself to the active system, and switches control board 4-1 that has been the active system till then to the standby system.

At this time, control boards 4-1 and 4-2 respectively store the setting information needed for function units 62 and 72 of packet transfer boards 6 and 7 and for function unit 82 of packet processing board 8.

Consequently, after control board 4-2 is switched from the standby system to the active system, control board 4-2 can immediately maintain the control performed thus far.

Each of control boards 4-1 and 4-2 is connected to layer 2 switch board 9-1 in advance. Therefore, the control packet can be transmitted and received simultaneously with the operation of system switching.

Next, a description is given of an operation performed when a failure occurs in packet transfer board 6-1 of the active system. Note that an operation similar to the operation performed when the failure occurs in packet transfer board 6-1 described below is performed also when a failure occurs in packet transfer board 7-1 connected to network 2.

Control board 4-1 of the active system transmits a control packet to packet transfer board 6-1, and determines that a failure has occurred in packet transfer board 6-1 when there is no reply from packet transfer board 6-1.

Moreover, the failure in packet transfer board 6-1 of the active system is detected by fault detection section 61a of controller 61 in packet transfer board 6-2 of the standby system. Then, control board 4-1 is informed of the control packet from failure notifying unit 61b.

At this time, before control board 4-1 is informed of the control packet, port manager 61c of packet transfer board 6-2 of the standby system closes the port in packet transfer board 6-1 of the active system, and opens the port in packet transfer board 6-2 of the standby system.

When failure detector 41b of controller 41 in control board 4-1 of the active system detects failure in packet transfer board 6-1 as described above, system switching controller 41c switches packet transfer board 6-2 that has been the standby system until then to the active system.

At this time, at the same time as packet transfer board 6-2 is instructed to switch to the active system, switching board function setting unit 41d transmits, via the control packet, the setting information needed to execute the functions of function unit 62 of packet transfer board 6-1 stored in identical information storing unit 41e.

In response to this, controller 61 in packet transfer board 6-2 switched to the active system can perform the function control of function unit 62 by using the function setting information used so far received from control board 4-1. Consequently, the user packet can be transmitted and received without stopping.

Packet transfer board 6-2 is previously connected to layer 2 switch board 9 and does not require a connection. Accordingly, packet transfer board 6-2 can transmit and receive the user packet and the control packet, even when packet transfer board 6-2 is switched from the standby system to the active system.

Next, description is given of an operation performed when a failure occurs in packet processing board 8-1 of the active system.

Also in this case, control board 4-1 of the active system transmits the control packet to packet processing board 8-1, and determines that a failure has occurred in packet processing board 8-1 when there is no reply from packet processing board 8-1.

Moreover, the failure in packet processing board 8-1 of the active system is detected by fault detection section 81a of controller 81 in packet processing board 8-2 of the standby system. Then, control board 4-1 is notified of the control packet from failure notifying unit 81b.

At this time, before control board 4-1 is notified of the control packet, port manager 81c in packet processing board 8-2 of the standby system closes the port in packet processing board 8-1 of the active system, and opens the port in packet processing board 8-2 of the standby system.

When failure detector 41b of controller 41 of control board 4-1 in the active system detects occurrence of the failure in packet processing board 8-1 as mentioned above, system switching controller 41c switches packet processing board 8-2 that has been the standby system until then to the active system.

At this time, at the same time as packet processing board 8-2 is instructed to switch to the active system, switching board function setting unit 41d transmits the setting information needed to execute the functions of function unit 82 of packet processing board 8-1 stored in identical information storing unit 41e by using the control packet.

In response to this switching of the system, controller 81 in packet processing board 8-2 switched to the active system can open the port and perform the function control of function unit 82 by using the function setting information used so far received from control board 4-1. Consequently, the user packet can be transmitted and received without stopping.

In addition, packet processing board 8-2 is connected to layer 2 switch board 9 from the beginning. Accordingly, even when packet processing board 8-2 is switched from the standby system to the active system, packet processing board 8-2 can transmit and receive the user packet and the control packet.

Subsequently, a description is given of an operation performed when a failure occurs in layer 2 switch board 9-1.

The control board 4-1 of the active system transmits the control packet to layer 2 switch board 9-1, and determines that a failure has occurred in layer 2 switch board 9-1 when there is no reply from layer 2 switch board 9-1.

When layer 2 switch board 9-2 of the standby system detects the failure in layer 2 switch board 9-1 of the active system, controller of layer 2 switch board 9-2 notifies control board 4-1 of a control packet that informs failure detection. At this time, before control board 4-1 is notified of the control packet, all the ports are closed in layer 2 switch board 9-1 where the failure has occurred.

When failure detector 41b of controller 41 in control board 4-1 of the active system detects the failure in layer 2 switch board 9-1 as mentioned above, system switching controller 41c switches layer 2 switch board 9-2 that has been the standby system till then to the active system.

At this time, layer 2 switch board 9-2, which has been the standby system until then is already connected to control board 4-1, packet transfer boards 6-1 and 7-1, and packet processing board 8-1, all of which are of the active system, by Ethernet (trademark) in advance. Accordingly, switching of the user data and the control packet is immediately allowed.

Next, a description is given of an operation performed when a failure occurs in board monitor module 10.

In board monitor module 10, when a failure occurs in board monitor module of the active system, board monitor module 10-2 of the standby system or control board 4-1 detects the failure.

Subsequently, board monitor module 10-2 that has been the standby system is switched to the active system in response to an instruction from control board 4-1. Both the active system and standby system of board monitor module 10 grasp in advance whether control board 4, packet transfer boards 6 and 7, packet processing board 8, and layer 2 switch board 9 are the active system or the standby system. Accordingly, even after being switched from the standby system to the active system, board monitor module 10 can continue maintaining the control of various boards.

(A-3) Effect of First Embodiment

As mentioned above, according to the first embodiment, layer 2 switch boards of the active system and of the standby system are provided, each layer 2 switch board has a connection setting in advance to all the boards of the active system and the standby system. Thereby, even when the system of a layer 2 switch board in which a failure has occurred is switched, switching of the data or the control packet with each board can be performed without performing anything. Accordingly, the communication service can be maintained.

Furthermore, according to the first embodiment, the control board stores the function setting information on the function units of the packet transfer board and the packet processing board. Thereby, even when the failure occurs in the packet transfer board or the packet processing board, the function control using the function setting information can be executed. The communication service can thus be maintained.

(B) Other Embodiments

An example in which the present invention is applied to a communication device has been described in the first embodiment. However, because the functions provided by the function unit of the packet transfer board and the function unit of the packet processing board can be flexibly changed, the invention can be applied to services implemented by the provided functions.

In the first embodiment, description has been given by taking an example in which a failure occurs in any one of the control board, the packet transfer board, the packet processing board, the layer 2 switch board, and the board monitor module. However, the invention can be also applied to cases where a failure occurs in several or all of the above-mentioned components.

Processing of each controller in the control board, the packet transfer board, the packet processing board, the layer 2 switch board, and the board monitor module described in the first embodiment is implemented by software processing.

The hardware configuration of these controllers includes, for example, a CPU, a ROM, a RAM, and an EEPROM. Various processing programs for implementing the functions described in the first embodiment are stored in the ROM, and various processings are implemented when the CPU executes these processing programs.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. A communication management system comprising:
 a first system packet transfer board including a controller and a function unit;
 a second system packet transfer board including a controller and a function unit;
 a first system packet processing board including a controller and a function unit;
 a second system packet processing board including a controller and a function unit;
 a communication control board Including a controller;
 a first system switch board connected to the communication control board, the first system packet transfer board, the second system packet transfer board, the first system packet processing board, and the second system packet processing board; and
 a second system switch board connected to the communication control board, the first system packet transfer board, the second system packet transfer board, the first system packet processing board, and the second system packet processing board;
 wherein the controller of the communication control board comprises:
 a failure detector configured to detect at least one of a failure in the first system packet transfer board, the first system packet processing board, and the first system switch board;
 a function setting information storing unit configured to store function setting information needed to execute functions of the function unit of the first system packet transfer board and the function unit of the first system packet processing board;
 a system switching controller configured to, upon detection of a failure in one or more of the first system packet transfer board, the first system packet processing board, and the first system switch board, output a system switching instruction to said one or more of the second system packet transfer board, the second system packet processing board, and the second system switch board, corresponding to the board in which the failure has occurred; and
 a function setting unit configured to provide the corresponding function setting information stored in the function setting information storing unit to one or both of the second system packet transfer board and the second system packet processing board that corresponds to the board in which the failure has occurred,
 wherein the first and second system switch boards includes:
 a control packet switching circuit connected to the control board, the first and second system packet transfer boards, the first and second system packet processing boards by a first connecting member; and
 a user packet switching circuit connected to the control board, the first and second system packet transfer boards, the first and second system packet processing boards by a second connecting member, which is physically different from the first connecting member.

2. The system of claim 1, wherein both of the first and second system communication control boards are previously connected to both of the first and second system switch boards.

3. The system of claim 1, wherein when the failure detector of the second system control board detects failure in the first system control board, the system switching controller of the second control board switches the second control board as an active system and switches the first control board as a standby system.

4. A communication management system comprising:
 a first system packet transfer board including a controller and a function unit;
 a second system packet transfer board including a controller and a function unit;
 a first system packet processing board including a controller and a function unit;
 a second system packet processing board including a controller and a function unit;
 a communication control board Including a controller;
 a first system switch board connected to the communication control board, the first system packet transfer board, the second system packet transfer board, the first system packet processing board, and the second system packet processing board; and
 a second system switch board connected to the communication control board, the first system packet transfer board, the second system packet transfer board, the first system packet processing board, and the second system packet processing board;
 wherein the controller of the communication control board comprises:
 a failure detector configured to detect at least one of a failure in the first system packet transfer board, the first system packet processing board, and the first system switch board;
 a function setting information storing unit configured to store function setting information needed to execute functions of the function unit of the first system packet transfer board and the function unit of the first system packet processing board;
 a system switching controller configured to, upon detection of a failure in one or more of the first system packet transfer board, the first system packet processing board, and the first system switch board, output a system switching instruction to said one or more of the second system packet transfer board, the second system packet processing board, and the second system switch board, corresponding to the board in which the failure has occurred; and
 a function setting unit configured to provide the corresponding function setting information stored in the function setting information storing unit to one or both of the second system packet transfer board and the second system packet processing board that corresponds to the board in which the failure has occurred,
 wherein when the second system switch board detects failure in the first system switch board, the second system switch board notifies the failure to the control board, the failure detector detects the failure based on the notification from the second system switch board, the system switching controller switches the second system switch board as an active system and switches the first system switch board as a standby system.

5. A communication management system comprising:
 a first system packet transfer board including a controller and a function unit;

a second system packet transfer board including a controller and a function unit;
a first system packet processing board including a controller and a function unit;
a second system packet processing board including a controller and a function unit;
a communication control board Including a controller;
a first system switch board connected to the communication control board, the first system packet transfer board, the second system packet transfer board, the first system packet processing board, and the second system packet processing board; and
a second system switch board connected to the communication control board, the first system packet transfer board, the second system packet transfer board, the first system packet processing board, and the second system packet processing board;
wherein the controller of the communication control board comprises:
a failure detector configured to detect at least one of a failure in the first system packet transfer board, the first system packet processing board, and the first system switch board;
a function setting information storing unit configured to store function setting information needed to execute functions of the function unit of the first system packet transfer board and the function unit of the first system packet processing board;
a system switching controller configured to, upon detection of a failure in one or more of the first system packet transfer board, the first system packet processing board, and the first system switch board, output a system switching instruction to said one or more of the second system packet transfer board, the second system packet processing board, and the second system switch board, corresponding to the board in which the failure has occurred; and
 a function setting unit configured to provide the corresponding function setting information stored in the function setting information storing unit to one or both of the second system packet transfer board and the second system packet processing board that corresponds to the board in which the failure has occurred, wherein the controller of the second system packet transfer board comprises:
a failure notifying unit configured to, upon detection of a failure in the first system packet transfer board, notify the first system control board of the occurrence of the failure; and
 a port manager configured to close a port of the first system packet transfer board connected to the first system switch board, and to simultaneously open a port of the second system packet transfer board connected to the first system switch board before the notification of the occurrence of the failure.

6. A communication management system comprising:
a first system packet transfer board including a controller and a function unit;
a second system packet transfer board including a controller and a function unit;
a first system packet processing board including a controller and a function unit;
a second system packet processing board including a controller and a function unit;
a communication control board Including a controller;
a first system switch board connected to the communication control board, the first system packet transfer board, the second system packet transfer board, the first system packet processing board, and the second system packet processing board; and
a second system switch board connected to the communication control board, the first system packet transfer board, the second system packet transfer board, the first system packet processing board, and the second system packet processing board;
wherein the controller of the communication control board comprises:
a failure detector configured to detect at least one of a failure in the first system packet transfer board, the first system packet processing board, and the first system switch board;
a function setting information storing unit configured to store function setting information needed to execute functions of the function unit of the first system packet transfer board and the function unit of the first system packet processing board;
a system switching controller configured to, upon detection of a failure in one or more of the first system packet transfer board, the first system packet processing board, and the first system switch board, output a system switching instruction to said one or more of the second system packet transfer board, the second system packet processing board, and the second system switch board, corresponding to the board in which the failure has occurred; and
a function setting unit configured to provide the corresponding function setting information stored in the function setting information storing unit to one or both of the second system packet transfer board and the second system packet processing board that corresponds to the board in which the failure has occurred,
wherein the controller of the second system packet processing board comprises:
a failure notifying unit configured to, upon detection of a failure in the first system packet processing board, notify the first system control board of the occurrence of the failure; and
a port manager configured to close a port of the first system packet processing board connected to the first system switch board, and to simultaneously open a port of the second system packet processing board connected to the first system switch board before the notification of the occurrence of the failure.

7. A communication management system comprising:
a first system packet transfer board including a controller and a function unit;
a second system packet transfer board including a controller and a function unit;
a first system packet processing board including a controller and a function unit;
a second system packet processing board including a controller and a function unit;
a communication control board Including a controller;
a first system switch board connected to the communication control board, the first system packet transfer board, the second system packet transfer board, the first system packet processing board, and the second system packet processing board; and
a second system switch board connected to the communication control board, the first system packet transfer board, the second system packet transfer board, the first system packet processing board, and the second system packet processing board;

wherein the controller of the communication control board comprises:
a failure detector configured to detect at least one of a failure in the first system packet transfer board, the first system packet processing board, and the first system switch board;
a function setting information storing unit configured to store function setting information needed to execute functions of the function unit of the first system packet transfer board and the function unit of the first system packet processing board;
a system switching controller configured to, upon detection of a failure in one or more of the first system packet transfer board, the first system packet processing board, and the first system switch board, output a system switching instruction to said one or more of the second system packet transfer board, the second system packet processing board, and the second system switch board, corresponding to the board in which the failure has occurred; and
a function setting unit configured to provide the corresponding function setting information stored in the function setting information storing unit to one or both of the second system packet transfer board and the second system packet processing board that corresponds to the board in which the failure has occurred,
wherein the control board has a duplex configuration that includes a first system control board and a second system control board and
each of the function setting information storing units store the identical setting information sequentially.

* * * * *